United States Patent [19]

Jones

[11] 4,011,734
[45] Mar. 15, 1977

[54] CRYOGENIC PRESSURE REGULATOR

[75] Inventor: Robert L. Jones, Irvine, Calif.

[73] Assignee: Parker-Hannifin Corporation, Cleveland, Ohio

[22] Filed: May 8, 1975

[21] Appl. No.: 575,627

[52] U.S. Cl. .......................... 62/132; 137/505.22; 137/505.47; 137/630.14
[51] Int. Cl.$^2$ ........................................ F25B 49/00
[58] Field of Search ..... 137/505.2, 505.21, 505.22, 137/505.23, 505.24, 505.47, 630, 630.14, 630.15; 308/DIG. 8; 62/217, 132

[56] References Cited
UNITED STATES PATENTS

| | | | |
|---|---|---|---|
| 613,737 | 11/1898 | Thompson | 137/505.22 X |
| 799,723 | 9/1905 | Dewrance | 137/505.2 |
| 814,285 | 3/1906 | Gold | 137/630.15 X |
| 1,235,541 | 8/1917 | Anderson | 137/505.2 |
| 2,015,977 | 10/1935 | Thrall | 137/505.47 X |
| 2,179,824 | 11/1939 | Kip | 308/DIG. 8 |
| 2,264,306 | 12/1941 | Grove | 137/505.2 X |
| 2,627,443 | 2/1953 | Becker | 308/DIG. 8 |
| 2,854,990 | 10/1958 | Granberg | 137/505.47 X |
| 2,949,128 | 8/1960 | Carter | 137/630.14 X |
| 2,993,507 | 7/1961 | Daly | 137/630.14 X |

*Primary Examiner*—Harold W. Weakley
*Attorney, Agent, or Firm*—Donnelly, Maky, Renner & Otto

[57] ABSTRACT

A pressure regulator especially suited for cryogenic fluid and two-phase (gas and liquid mixture) flow application such as an aircraft fuel tank inerting system wherein the regulator controls the pressure and rate of flow of inerting fluid, e.g. nitrogen, into the fuel tank to pressurize the tank and to inert the tank ullage gases to render them noncombustible, said regulator being characterized in that the flow control valve has large and small variable area orifices which operate in sequence to minimize overshoot and undershoot, in that resonant oscillation is predictably damped and the damping remains substantially constant despite wear or change in clearances of the parts, and in that the valve actuator is thermally isolated from the cryogenic fluid flow path.

The use of the tandem or sequential valve seat arrangement aforesaid also allows the larger seat to have an extended life and greater resistance to contamination and wear because at low flow demands, the larger valve portion remains seated and thus does not operate extremely close to its seat while the smaller valve portion partakes of greater stroking relative to its seat to satisfy such low flow demands.

Furthermore, the regulator herein has a configuration such as to produce a large mechanical advantage to enable the regulator to provide a narrow pressure control band even with large variations in inlet fluid pressures and flow demands, this large mechanical advantage being obtained by the use of the rotary motion of a crank shaft having long and short crank arms.

2 Claims, 4 Drawing Figures

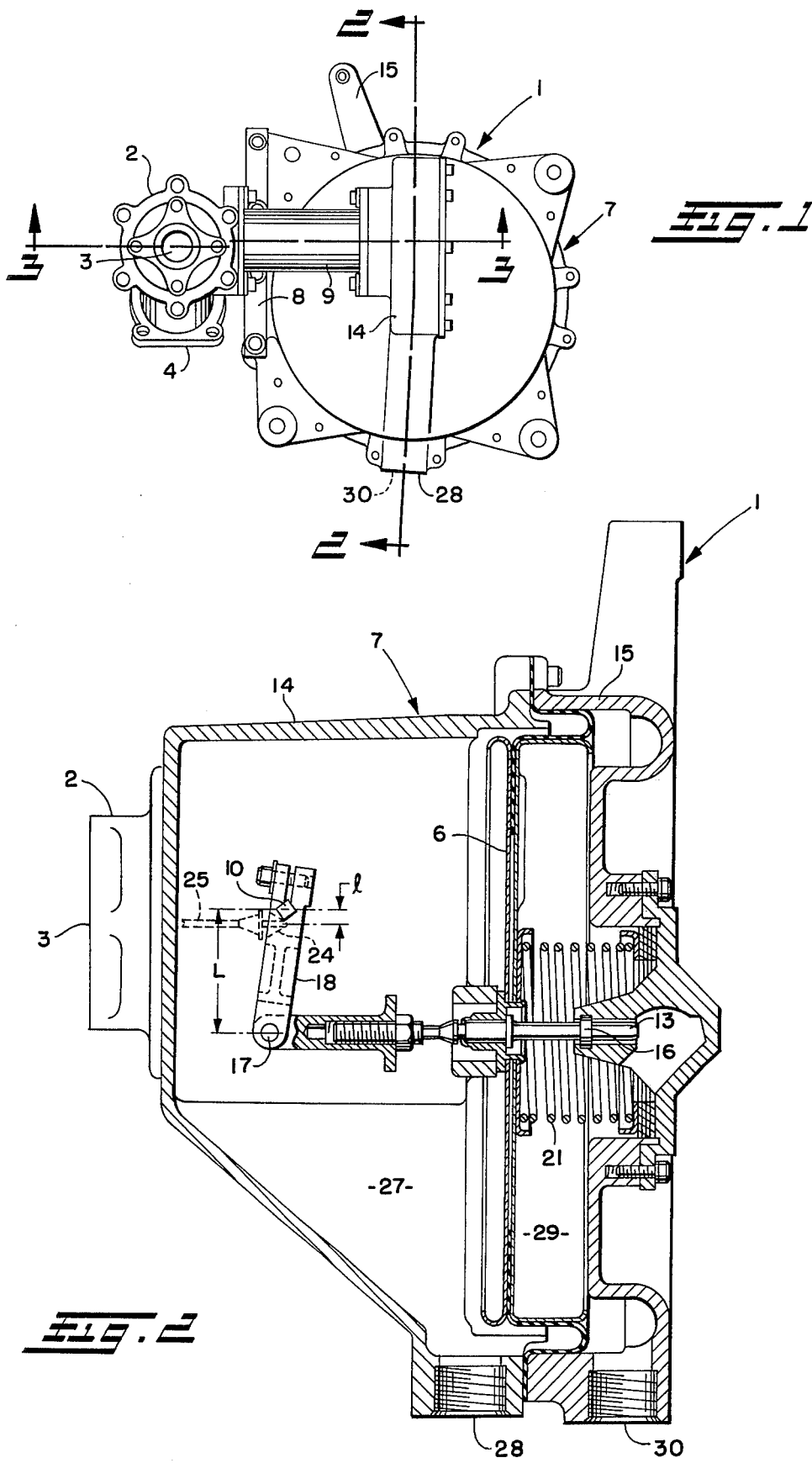

CRYOGENIC PRESSURE REGULATOR

BACKGROUND OF THE INVENTION

In a typical pressure regulator, an actuator, usually a diaphragm, is mechanically connected to a flow control valve, said actuator being designed to assume an equilibrium position proportional to the difference in pressure across a pressure sensing area thereof whereby as the regulated pressure increases, a force is created on the actuator which counteracts a spring load thereon and, upon compression of the spring, the valve will move toward passage closing position. As the regulated pressure decreases, the actuator will urge the valve in a direction to increase the rate of flow of fluid. Such typical regulator tends to be unstable, that is, as the pressure which is desired to be regulated increases, the valve opens excessively with resulting increase of pressure above desired value whereby the valve closes too far with resulting decrease of pressure below desired value. In many applications the resulting oscillation is not acceptable. A basic cause of instability in the typical regulator is that when the valve is nearly closed, say 0.0001 inch from its seat a very small change in valve position, say 0.001 inch, will cause a very large proportional change in flow area and, therefore, a very large change in flow rate. This large change in flow rate typically causes a rapid change of pressure so that the pressure goes too high before the actuator has time to react. The actuator, then belatedly sensing the too high pressure overcompensates by closing the valve too far causing an undershoot.

In addition, with only a single valve seat numerous cycles are incurred in response to small flow demands which cause a very short life. Additionally, a single valve operating close to the seat is sensitive to contamination damage and accelerated erosion and shortened life.

As known, flow forces and particularly in the case of two-phase flows also tend to cause oscillating forces in the moving parts of the regulator and because the moving parts constitute a spring mass system it has a resonant frequency so that oscillating forces tend to cause amplification of oscillating movement. A basic way to control resonant oscillation is to introduce the proper amount of friction, but the friction has a rather narrow tolerance because too little friction produces insufficient damping and too much causes excessive regulation error. Where such friction is provided, it is apt to change during the service life or operating conditions of the regulator and is difficult to accurately maintain in the manufacture of the regulator. In the case of a cryogenic application, the valve actuator must be made of materials that will withstand low temperatures, e.g. down to −420° F. and this results in shortened life.

SUMMARY OF THE INVENTION

In contradistinction to the foregoing, the present pressure regulator minimizes oscillation to provide a regulated pressure within a small range without substantial overshoot or undershoot, increases resistance to contamination and seat wear, extends useful life, controls resonant oscillation to provide a proper degree of damping which is readily repeatable in manufacture and which is not affected materially by wear or change of clearances between parts of the regulator, and thermally isolates the actuator from the fluid flow path as in the case of a regulator employed to control cryogenic fluid flow.

BRIEF DESCRIPTION OF THE DRAWING

FIG. 1 is a plan view of a pressure regulator embodying the present invention;

FIGS. 2 and 3 are cross-section views taken substantially along the lines 2—2 and 3—3, FIG. 1;

DETAILED DESCRIPTION OF A PREFERRED EMBODIMENT

Figure 3:
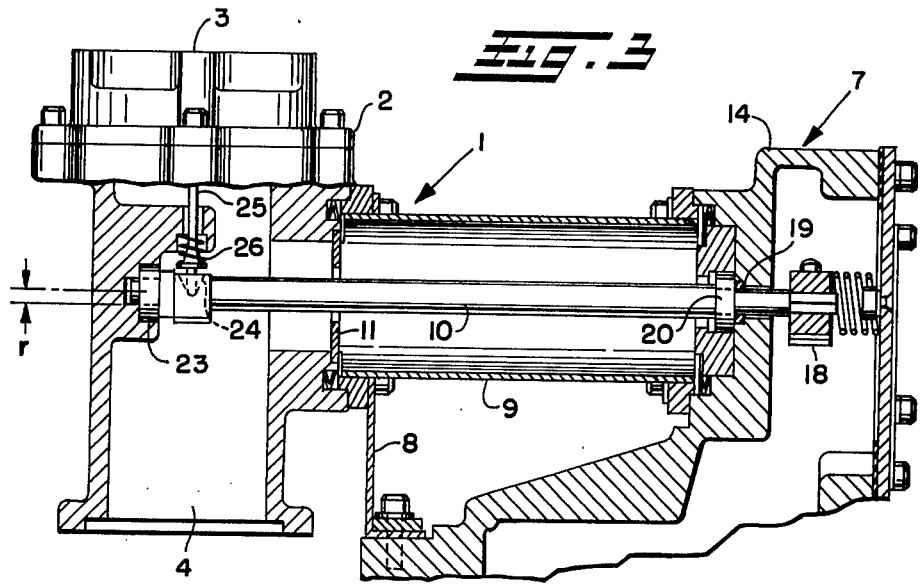
Figure 4:
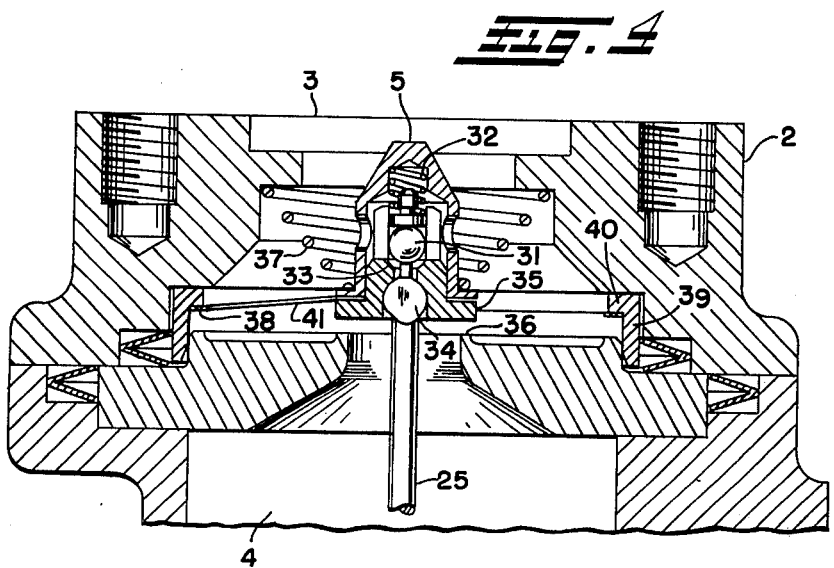
FIG. 4 is a cross-section view on enlarged scale showing the flow rate control valve in detail.

The pressure regulator 1 herein comprises a body assembly 2 having an inlet 3 which in an aircraft tank fuel inerting system communicates with a source of inerting fluid such as liquid nitrogen and an outlet 4 through which inerting fluid is conducted into the fuel tank via a conduit which may contain a heat exchanger or vaporizer therein to inert the ullage gases in the tank and to pressurize the tank within specified limits. The body assembly 2 contains an inlet valve assembly 5 which is operated by an actuator 6 contained in the housing assembly 7, said body assembly 2 and actuator housing assembly 7 being secured together as by means of the bracket 8 and spacer tube 9 which in the case of the cryogenic fluid application herein mentioned are made of material having a low heat conducting capacity such as stainless steel as is the shaft 10 which transmits actuator 6 motion to valve 5 motion. In addition, a shield 11 is provided at the body end of the spacer tube 9. In this way, the actuator housing assembly 7 and the actuator 6 are thermally isolated from the fluid flow passage through the body assembly 2 whereby the actuator 6, housing assembly 7 parts and seals, etc. can be made of nominal temperature materials without regard to cryogenic fluid temperatures because said components are subjected to essentially ambient temperature conditions.

The actuator 6 herein comprises a flexible diaphragm assembly having its outer peripheral portion clamped between the housing parts 14 and 15 and having at its center an axially disposed rod 13 of which one end portion is guided in a ring 16 of low coefficient of friction material, such as Teflon, and of which the other end portion is adjustable in length and has a pivot connection 17 with an arm 18 which is non-rotatably secured on the end of the aforesaid shaft 10 which extends into the housing part 14 through a sealing ring 19 which may be of Teflon or other low friction material and through a low friction bearing 20 as of carbon. A spring 21 is compressed between the diaphragm assembly 6 and the housing part 15 with the spring load being adjusted to predetermined value as by shims installed as shown. The other end of the shaft 10 is rotatably supported in another carbon bearing 23 and adjacent said bearing 23, the shaft 10 has a conical recess 24 with a rounded apex which is eccentric with respect to the axis of said shaft 10. A follower 25 is biased by spring 26 to engage its bottom rounded end with the bottom of the conical recess 24.

The diaphragm assembly 6 in a pressure regulator for an aircraft fuel tank inerting system for example has one side exposed to pressure in chamber 27 which is communicated with tank pressure through the port 28 and has the other side exposed to a reference pressure in chamber 29 through the port 30.

Referring now to the inlet valve assembly 5, when the diaphragm assembly 6 is in the stop position shown in FIG. 2, the follower 25 has been urged upwardly to unseat the small ball valve 31 which is biased by spring 32 toward its seat 33, and the flattened portion 34 of the follower 25 has moved the much larger poppet valve 35 away from its seat 36 against the biasing force of spring 37. This is the maximum flow position of the inlet valve assembly 5 with fluid flowing between the ball 31 and its seat 33 and between the poppet valve 35 and its seat 36. By way of example, the diameter of the poppet valve seat 36 is several times that of the ball valve seat 33 for a reason now to be explained. If the differential pressure in the chambers 27 and 29 i.e. the fuel tank-ambient pressure differential, is greater than desired, the shaft 10 will have been turned so that the follower 25 is disengaged from both the ball 31 and the poppet valve 35 whereby both valves are in seated position. Now, as the tank pressure sensed in the chamber 27 decreases with respect to the reference ambient pressure in chamber 29, the shaft 10 will be turned by the arm 18 in a clockwise direction as viewed in FIG. 2 so that the follower 25 first engages the ball 31 to push it away from its seat 33 and therefore, say a 0.001 inch stroke after engagement of the follower 25 with the ball 31 will open a small flow area so that the increase in fluid flow rate will be relatively small and the rise of tank pressure will be small so as to minimize pressure overshoot. Should the flow demand be increased substantially and the tank pressure continue to decrease even with the initial small flow, the follower 25 continues to lift the ball 31 still further off the seat 33 to increase the fluid flow rate until the ball 31 has moved say 0.010 inch away from the seat 33. At that time, the follower 25 engages the poppet valve 35 and then if the tank pressure in chamber 27 continues to decrease the follower 25 lifts the poppet valve 35 away from its seat 36. The poppet valve 35 is centered and guided without sliding friction by means of the thin metal ring 38 which is secured within ring 39 against the flange 40 and which has three or more equally spaced radially inwardly extending axially flexible fingers 41 extending to the upstanding cylindrical boss of the poppet valve 35. The axial force of the fingers 41 on poppet valve 35 is negligible as compared with the axial force of spring 37.

Valve instability normally occurs at low flow demands, and, hence, if only a single large seat were employed as in conventional regulators to accommodate the maximum required flow demand, a low flow demand would cause the single large valve member to move away from its seat, say, 0.001 inch but because the flow diameter is relatively large, the flow past the large seat is larger and the rise of downstream pressure will be rapid whereby the regulated pressure in the tank will go too high before the valve actuator has time to respond. When the actuator does respond, it will be late with the effect that it will overcompensate and close the single large valve member too far thus causing a pressure undershoot. By providing a smaller valve 31 as herein to perform this pressure control at low flow demand, valve stability and pressure control are insured.

The valve 31 and 35 strokes are arranged so that the large valve seat 36 only opens under relatively infrequent periodic large flow demands so that the valve life and contamination resistance are achieved. A valve that only strokes a short distance, say, 0.001 inch is a natural trap for particle contamination. By having the small valve 31 its strokes are relatively large and therefore particles do not accumulate.

As already indicated in connection with typical pressure regulators, flow forces on the inlet valve tend to cause oscillating forces in the moving parts of the regulator and because such moving parts constitute spring mass systems, they have resonant frequencies so that oscillating forces tend to cause amplification of oscillating movement and this is also likely to cause instability. The basic way to control resonant oscillation is to introduce the proper amount of friction but there is a rather narrow tolerance on the magnitude of friction which is desirable because too little friction produces insufficient damping and too much friction causes excessive regulation error. Moreover, it is vital that the magnitude of friction does not change with service life or operating conditions and that it be accurately repeatable in manufacture from unit to unit. In the present regulator 1 the required friction is provided in the bearings 20 and 23 for the shaft 10 and this results in desirable features. In other words, the magnitude of friction is determined by the coefficients of friction, the bearing diameters, and the normal force on the bearing 20 and 23 all of which are controllable in this design. Furthermore, the predetermined magnitude of friction is independent of wear because although wear may change the clearances between the bearings 20 and 23 and the shaft 10, the friction forces do not change appreciably with wear.

By reason of the thermal isolation of the body assembly 2 and the actuator 6, the latter is subjected essentially to ambient temperature conditions and hence said actuator 6, seal 19 and guide 16 may be made of suitable low friction material without regard to performance at cryogenic fluid temperatures.

Another unique feature of this invention is the use of a high mechanical advantage rotary motion to achieve the required high pressure control band accuracy. The rotary motion as stated above also provides controlled friction and prevents instabilities. The mechanical advantage is achieved by the use of levers. The length L of arm 18 from the centerline of the shaft 10 to the centerline of the actuator 6 relative to the length $l$ of the arm from the centerline of the conical recess 24 to the centerline of the shaft 10 provides a mechanical advantage which may be say 10 to 1 which has the effect of providing an actuator diaphragm 6 sense area that is ten times larger in area i.e. the inlet valve will be positioned with only one-tenth of the change in the actuator 6 sense pressure if the mechanical advantage were not provided.

Furthermore, the rotary mechanism of this invention provides a regulator 1 that is resistant to ice formation. If any moisture is present, the cryogenic temperature would immediately cause ice formation. This insensitivity to icing is achieved because the bearing diameters 20 and 23 are small compared to the force available from the actuator 6. The rotary bearings 20 and 23, therefore, are readily broken free of ice formation because of the large mechanical advantage of the actuator 6 force acting through the long moment arm 18 whereas the bearing radius $r$ is very small so that a large shear force is available at the bearing radius. Accordingly, ice formation in the bearings is readily sheared by the multiplication of the actuator 6 force whereas in a linear sliding bearing only the actuator force is available for shearing ice formation.

The embodiments of the invention in which an exclusive property or privilege is claimed are defined as follows:

1. A pressure regulator comprising a body having a passage therethrough including an inlet adapted for connection to a fluid pressure source and an outlet; an inlet valve in said body including small and large valve members spring-biased to close said passage and being movable to define respective small and large variable area orifices; a valve actuator in said body having one side exposed to fluid under pressure downstream of said outlet and movable thereby according to the magnitude of such fluid under pressure; and motion transmitting means operatively engaged with said actuator and inlet valve to sequentially actuate said small and large valve members to successively progressively increase the flow areas of the respective variable area orifices responsive to movement of said actuator in one direction by decreasing downstream fluid pressure; said actuator comprising a flexible diaphragm which is spring-biased in such one direction; said motion transmitting means comprising a central axially extending rod on said diaphragm; a crankshaft journaled in said body having a crank arm at one end pivotally connected to said rod and having a cam at the other end; a cam follower engaged with said cam to sequentially engage said small and large valve members responsive to turning of said crankshaft in one direction by movement of said diaphragm in said one direction thus to progressively increase the small variable area orifice to predetermined maximum size and then to progressively increase the large variable area orifice; the radius of said crank arm being several times the radius of engagement of said cam and follower to produce a large mechanical advantage of actuator force to cam follower force to provide a narrow pressure control band despite large variations in inlet fluid pressures and flow demands; said body comprising separate parts for said inlet valve and for said actuator; said body parts being connected together by means which thermally isolate the body part containing said actuator from the body part containing said inlet valve in the case of connection of said inlet to a cryogenic fluid pressure source; said crankshaft being elongated between said arm and said cam and extending laterally of said outlet; said body parts having spaced-apart portions, and a spacer tube surrounding the crankshaft between said arm and cam and extending between said spaced-apart portions to define a laterally extending pocket open at one end to said passage downstream of said inlet valve and closed at the other end; said means for thermally isolating said body parts from each other comprising said spacer tube and crankshaft being of material having a low thermal conductivity.

2. A pressure regulator comprising a body having a passage therethrough including an inlet adapted for connection to a fluid pressure source and an outlet; an inlet valve in said body including small and large valve members spring-biased to close said passage and being movable to define respective small and large variable area orifices; a valve actuator in said body having one side exposed to fluid under pressure downstream of said outlet and movable thereby according to the magnitude of such fluid under pressure; and motion transmitting means operatively engaged with said actuator and inlet valve to sequentially actuate said small and large valve members to successively progressively increase the flow areas of the respective variable area orifices responsive to movement of said actuator in one direction by decreasing downstream fluid pressure acting thereon; said motion transmitting means comprising a lever system of which a lever arm engaged with said actuator is of length several times that of a lever arm engaged with said valve to produce a large mechanical advantage of actuator force to inlet valve opening force to provide a narrow pressure control band despite large variations in inlet fluid pressures and flow demands; said lever system comprising an elongated crankshaft journaled in sleeve bearings in said body adjacent to said lever arms thereof and extending laterally from said outlet, said lever arm which is engaged with said actuator being of length several times the radii of said bearings whereby, in the case of connection of said inlet to a cryogenic fluid pressure source, ice formation at said bearings is sheared by the torque on said crankshaft resulting from actuator force on the lever arm engaged thereby; portions of said body containing said actuator and inlet valve being spaced apart with said crankshaft and a surrounding spacer tube extending therebetween; said portions and spacer tube defining a laterally extending pocket open at one end to said passage downstream of said inlet valve and closed at the other end; said crankshaft and spacer tube being of material having a low thermal conductivity thus to thermally isolate said body portions from each other.

* * * * *